United States Patent
Chiang et al.

(10) Patent No.: US 10,752,315 B2
(45) Date of Patent: Aug. 25, 2020

(54) SHOCK ABSORPTION DEVICE

(71) Applicant: Giant Manufacturing Co., Ltd., Taichung (TW)

(72) Inventors: Wei-Teng Chiang, Taichung (TW); Chao-Shun Yang, Taichung (TW); Chia-Wei Lin, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 0 days.

(21) Appl. No.: 16/503,592

(22) Filed: Jul. 4, 2019

(65) Prior Publication Data

US 2020/0017160 A1  Jan. 16, 2020

(30) Foreign Application Priority Data

Jul. 16, 2018 (TW) .............................. 107124469 A

(51) Int. Cl.
| | |
|---|---|
| *B62K 21/16* | (2006.01) |
| *B62K 21/14* | (2006.01) |
| *B62K 19/04* | (2006.01) |
| *B62K 21/22* | (2006.01) |

(52) U.S. Cl.
CPC .............. *B62K 21/14* (2013.01); *B62K 19/04* (2013.01); *B62K 21/22* (2013.01)

(58) Field of Classification Search
CPC ................................. B62K 21/14; B62K 21/16
See application file for complete search history.

(56) References Cited

U.S. PATENT DOCUMENTS

| | | | | |
|---|---|---|---|---|
| 4,939,950 A | * | 7/1990 | Girvin .................... | B62K 21/14 280/279 |
| 5,241,881 A | * | 9/1993 | Chen ...................... | B62K 21/14 280/276 |
| 9,932,083 B1 | * | 4/2018 | Lorscheider ........... | B62K 21/14 |
| 2005/0150321 A1 | * | 7/2005 | Liao ........................ | B62K 21/16 74/551.1 |
| 2015/0158545 A1 | * | 6/2015 | Lanz ...................... | B62K 21/16 74/551.3 |

(Continued)

FOREIGN PATENT DOCUMENTS

| | | | | |
|---|---|---|---|---|
| DE | | 9306261 U1 * | 7/1993 | ............. B62K 21/14 |
| DE | 102013016615 | | 4/2015 | |

(Continued)

*Primary Examiner* — Luis A Gonzalez
(74) *Attorney, Agent, or Firm* — JCIPRNET

(57) ABSTRACT

A shock absorption device includes first and second assemblies, at least one pivot component and a buffering component. The first assembly is adapted to be connected to a first component of a bicycle and has at least one conical hole. The second assembly is adapted to be connected to a second component of the bicycle. The pivot component is fastened on the second assembly and has a conical portion. The conical portion is inserted into the conical hole such that the first and second assemblies are pivoted to each other. The conical portion is leaned against and fitted on the conical hole. The buffering component is disposed between the first and second assemblies. When the first and second assemblies rotate relatively to each other by taking a central axis of the conical hole as a rotation axis, force between the first and second assemblies is buffered by the buffering component.

16 Claims, 6 Drawing Sheets

(56) References Cited

U.S. PATENT DOCUMENTS

2017/0043838 A1    2/2017    Ahnert et al.

FOREIGN PATENT DOCUMENTS

| TW | 348689  | 12/1998 |
| TW | M270113 | 7/2005  |
| TW | M275150 | 9/2005  |
| TW | M469254 | 1/2014  |
| TW | M477428 | 5/2014  |
| TW | M498156 | 4/2015  |
| TW | M535681 | 1/2017  |

* cited by examiner

SHOCK ABSORPTION DEVICE

CROSS-REFERENCE TO RELATED APPLICATION

This application claims the priority benefit of Taiwan application serial no. 107124469, filed on Jul. 16, 2018. The entirety of the above-mentioned patent application is hereby incorporated by reference herein and made a part of this specification.

BACKGROUND OF THE INVENTION

Field of the Invention

The invention relates to a shock absorption device, and more particularly to a shock absorption device adapted to a bicycle.

Description of Related Art

In recent years, the bicycle market has flourished, and both high-end racing type of bicycles and common type of bicycles for leisure and entertainment have been favored by consumers. When a bicycle cruises on the road, the vibration of the ground is transmitted to handlebars through stem and is absorbed by the rider's hands in the end. When riding for a long period of time, the rider is easy to feel fatigue because of the vibration. Therefore, a stem of a bicycle having a shock-absorbing function has thus been invented. The shock-absorbing method is generally disposing a buffering component having flexibility between the two components of the stem of the bicycle.

However, if the two components is not tight enough, a gap may be easily created between the two components when the rider performs stand-up pedaling, and the rigidity of the bicycle is thus affected. In addition, depending on different riding environments, different riding habits, etc., the shock absorption strength (i.e. damping value) of a conical portion required by the stem of the bicycle is different. Nonetheless, in terms of the current stem of the bicycle, the shock absorption strength of the current stem of the bicycle may only be changed by changing the buffering component. Therefore, it is inconvenient to the user.

SUMMARY OF THE INVENTION

The invention provides a shock absorption device, which avoids creating a gap between components of the shock absorption device, and facilitates the adjustment of the shock absorption strength of the buffering assembly.

The shock absorption device of the invention is adapted to a bicycle. The bicycle includes a first component and a second component. The shock absorption device includes a first assembly, a second assembly, at least one pivot component, and a buffering component. The first assembly is adapted to be connected to the first component. The first assembly has at least one conical hole. The second assembly is adapted to be connected to the second component. The pivot component is fastened on the second assembly and has a conical portion. A conical portion is inserted into the conical hole such that the first assembly and the second assembly are pivoted to each other, and the conical portion is leaned against and fitted on an inner wall of the conical hole. The buffering component is disposed between the first assembly and the second assembly. When the first assembly and the second assembly rotate relatively to each other by taking a central axis of the conical hole as a rotation axis, force between the first assembly and the second assembly is buffered by the buffering component.

In an embodiment of the invention, the aforementioned conical portion is leaned against the inner wall of the conical hole through fastening force between the pivot component and the second assembly.

In an embodiment of the invention, a taper of the aforementioned conical portion is equal to a taper of the conical hole.

In an embodiment of the invention, the aforementioned shock absorption device includes a fastening component, wherein the aforementioned second assembly has at least one fastening hole. The fastening hole and the conical hole have the same central axis, the fastening component has a fastening portion. The fastening portion is fastened to the fastening hole.

In an embodiment of the invention, the number of the aforementioned at least one conical hole is two, the number of the at least one fastening hole is two. The number of the at least one pivot component is two. The two conical holes are located between the two fastening holes. The first assembly and the second assembly are limited between the two pivot components.

In an embodiment of the invention, the aforementioned shock absorption device includes a fastening component, wherein the first assembly has a through hole, the through hole is connected between the two conical holes, and the fastening component passes through the through hole and is fastened between the two pivot components.

In an embodiment of the invention, the aforementioned first assembly includes a main body and a protruding portion. The protruding portion protrudes from a main body of the first assembly into the second assembly. The conical hole is formed in the protruding portion.

In an embodiment of the invention, the aforementioned buffering component includes two buffering portions and a connecting portion. The two buffering portions are respectively located on the opposite sides of the protruding portion and are against the main body of the first assembly. The connecting portion is connected between the two buffering portions and is extended along the exterior of the protruding portion.

In an embodiment of the invention, the thickness of each of the aforementioned buffering portions is greater than the thickness of the connecting portion.

In an embodiment of the invention, the aforementioned first assembly is adapted to be assembled on the first component of the bicycle along an assembly axis vertical to a reference plane. When the second assembly is connected to the first assembly in a first state, the second assembly offsets upward away from the reference plane. When the second assembly is connected to the first assembly in a second state, the second assembly offsets downward away from the reference plane.

In an embodiment of the invention, the aforementioned shock absorption device includes at least one positioning column, where the first assembly has at least one positioning hole, the second assembly has at least one positioning slot, and when the second assembly is in the first state or in the second state, the positioning column is adapted to pass through the positioning slot to be fixed onto the positioning hole and to be against an end of the positioning slot.

The shock absorption device of the invention is adapted to a bicycle. The bicycle includes a first component and a second component. The shock absorption device includes a first assembly, a second assembly, and a buffering component. The first assembly is adapted to be connected to the first component. The second assembly is adapted to be connected to the second component. The first assembly and the second assembly are pivotally connected to each other. The second assembly includes a pre-pressing structure. A buffering component is disposed between the first assembly and the pre-pressing structure. The pre-pressing structure applies pre-pressing force to the buffering component. When the first assembly and the second assembly rotate relative to each other, the buffering component buffers the force that the first assembly and the second assembly interact with each other.

In an embodiment of the invention, the aforementioned pre-pressing structure includes a pre-pressing component and a screw component. The buffering component is disposed between the first assembly and the pre-pressing component. The screw component is screwed on the second assembly and pushes the pre-pressing component toward the buffering component, the screw component is adapted to rotate to change the pre-pressing force of the buffering component applied by the pre-pressing component.

In an embodiment of the invention, the aforementioned first assembly includes a main body and a protruding portion. The protruding portion protrudes from the main body of the first assembly into the second assembly. The second assembly is pivoted on the first assembly by the protruding portion.

In an embodiment of the invention, the aforementioned buffering component includes two buffering portions and a connecting portion. The two buffering portions are respectively located on the opposite sides of the protruding portion and are against the main body of the first assembly. The connecting portion is connected between the two buffering portions and is extended along the exterior of the protruding portion.

In an embodiment of the invention, the thickness of each of the aforementioned buffering portions is greater than the thickness of the connecting portion.

In an embodiment of the invention, the aforementioned first assembly is adapted to be assembled on the first component of the bicycle along an assembly axis vertical to a reference plane. The second assembly is tilted to the reference plane.

In an embodiment of the invention, the aforementioned shock absorption device includes at least one positioning column, where the first assembly has at least two positioning holes. The second assembly has at least one positioning slot. The positioning column is adapted to pass through the positioning slot to be fixed onto the positioning hole and to be against an end of the positioning slot. In addition, the positioning column is adapted to pass through the positioning slot to be fixed onto the other positioning hole and to be against the other end of the positioning slot.

In view of the above, in the shock absorption device of the invention, the first assembly and the second assembly are assembled to each other through the pivot component having the conical portion. The pivot component is fastened on the first assembly, and the conical portion of the pivot component is leaned against and fitted on the conical hole, so as to ensure no gap created between the conical portion and the conical hole through the cooperation between the conical portion and conical hole. In addition, in the shock absorption device of the invention, by using the pre-pressing structure to pre-press on the buffering component, the user can adjust the shock absorption strength of the buffering component merely through adjusting the pre-pressing force applied to the buffering component by the pre-pressing structure. There is no need to change the buffering component, and therefore the convenience in use of the shock absorption device is improved.

To provide a further understanding of the aforementioned and other features and advantages of the disclosure, exemplary embodiments, together with the reference drawings, are described in detail below.

DESCRIPTION OF THE EMBODIMENTS

Figure 1:
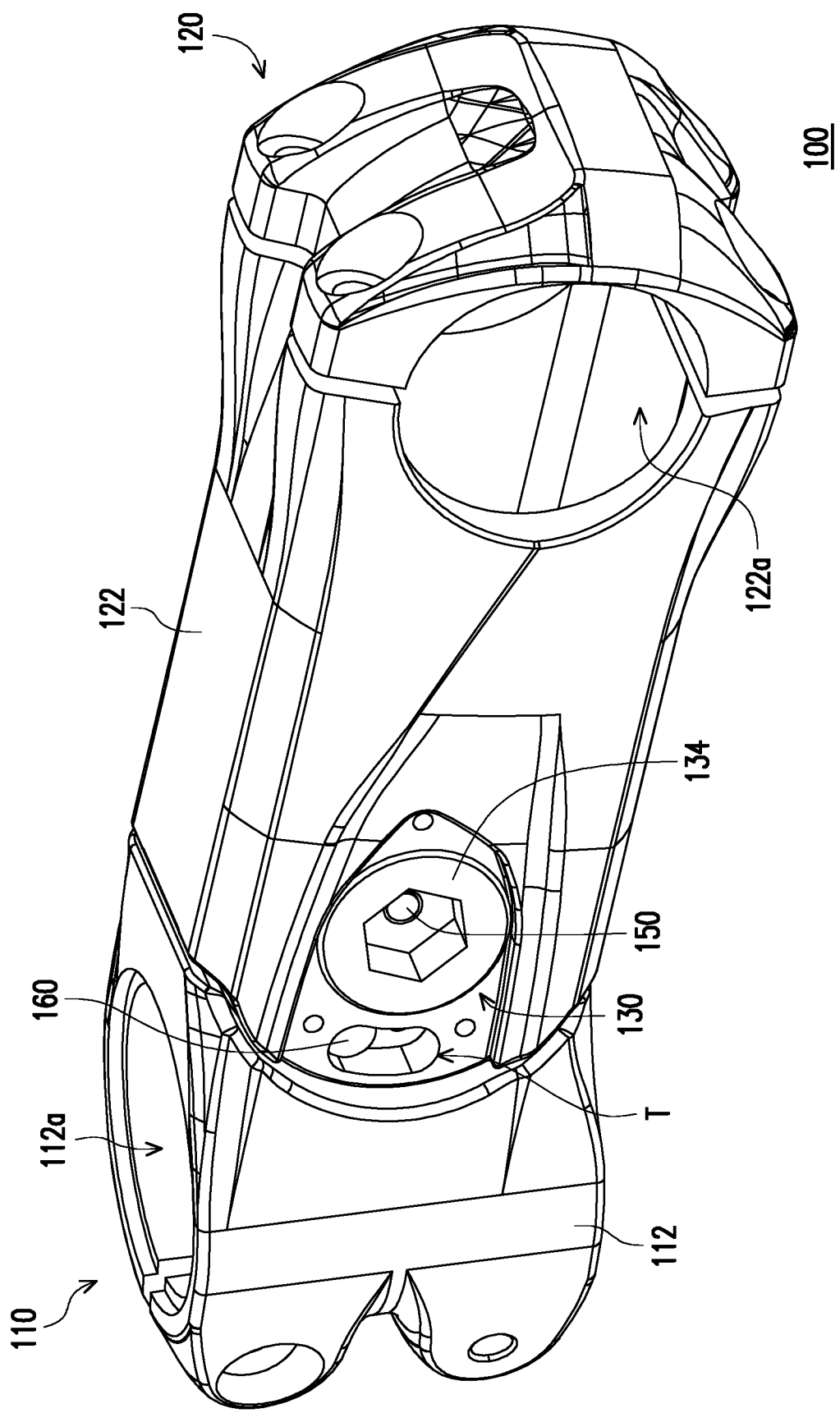
FIG. 1 is a 3D diagram of a shock absorption device of an embodiment of the invention.

FIG. 1 is a 3D diagram of a shock absorption device of an embodiment of the invention. Please refer to FIG. 1. A shock absorption device 100 of an embodiment of the invention is, for example, a stem of a bicycle, adapted to a bicycle. The shock absorption device 100 includes a first assembly 110 and a second assembly 120 connected to each other. The first assembly 110 is adapted to be connected to the first component of the bicycle by an assembly hole 112a of the main body 112. The second assembly 120 is adapted to be connected to the second component of the bicycle by the assembly hole 122a of the main body 122. The first component is, for example, a frame of the bicycle. The second component is, for example, a handle of the bicycle. However, the invention is not limited thereto.

Figure 2:
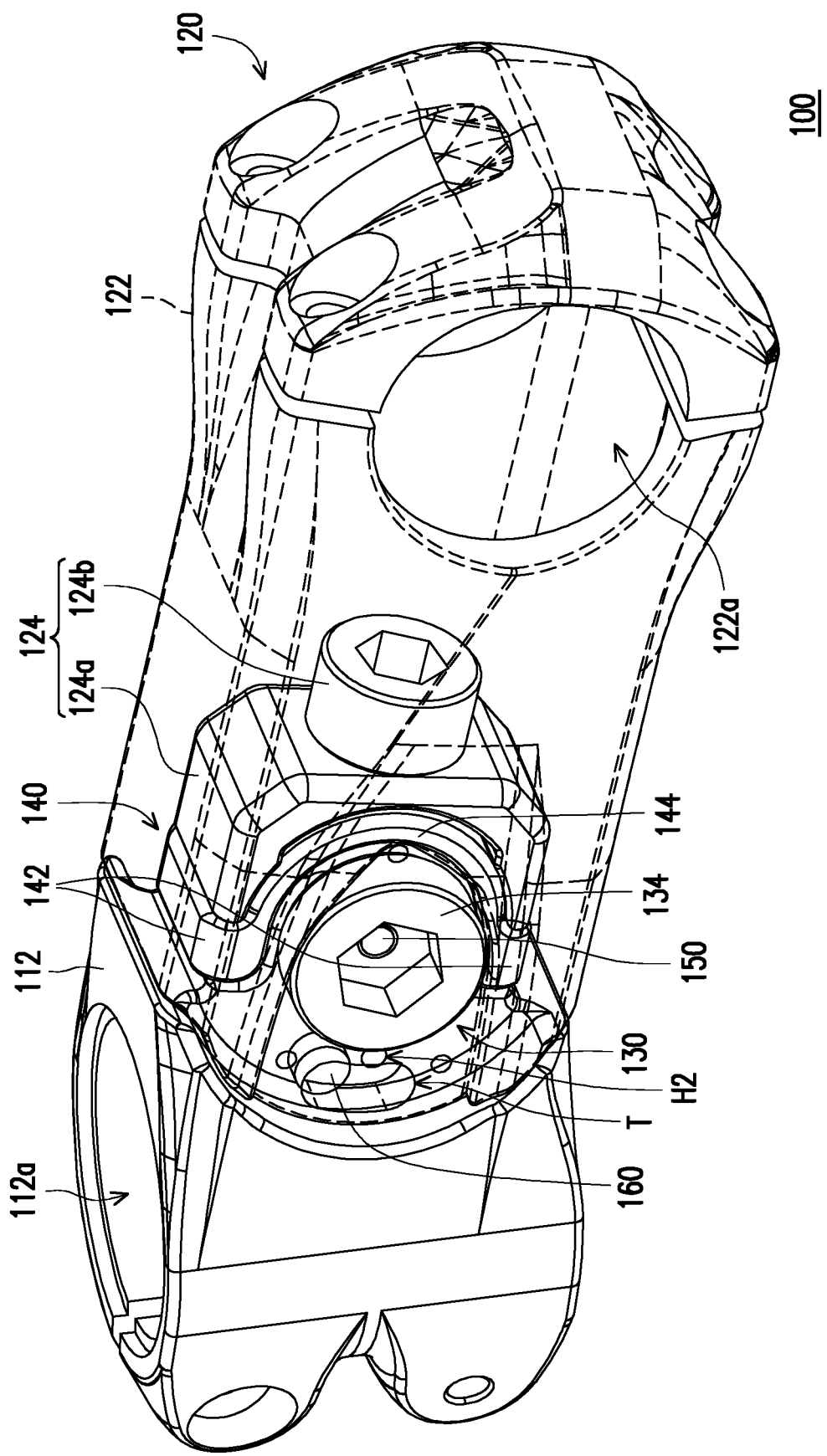
FIG. 2 is a partial perspective view of the shock absorption device of FIG. 1.
Figure 3:
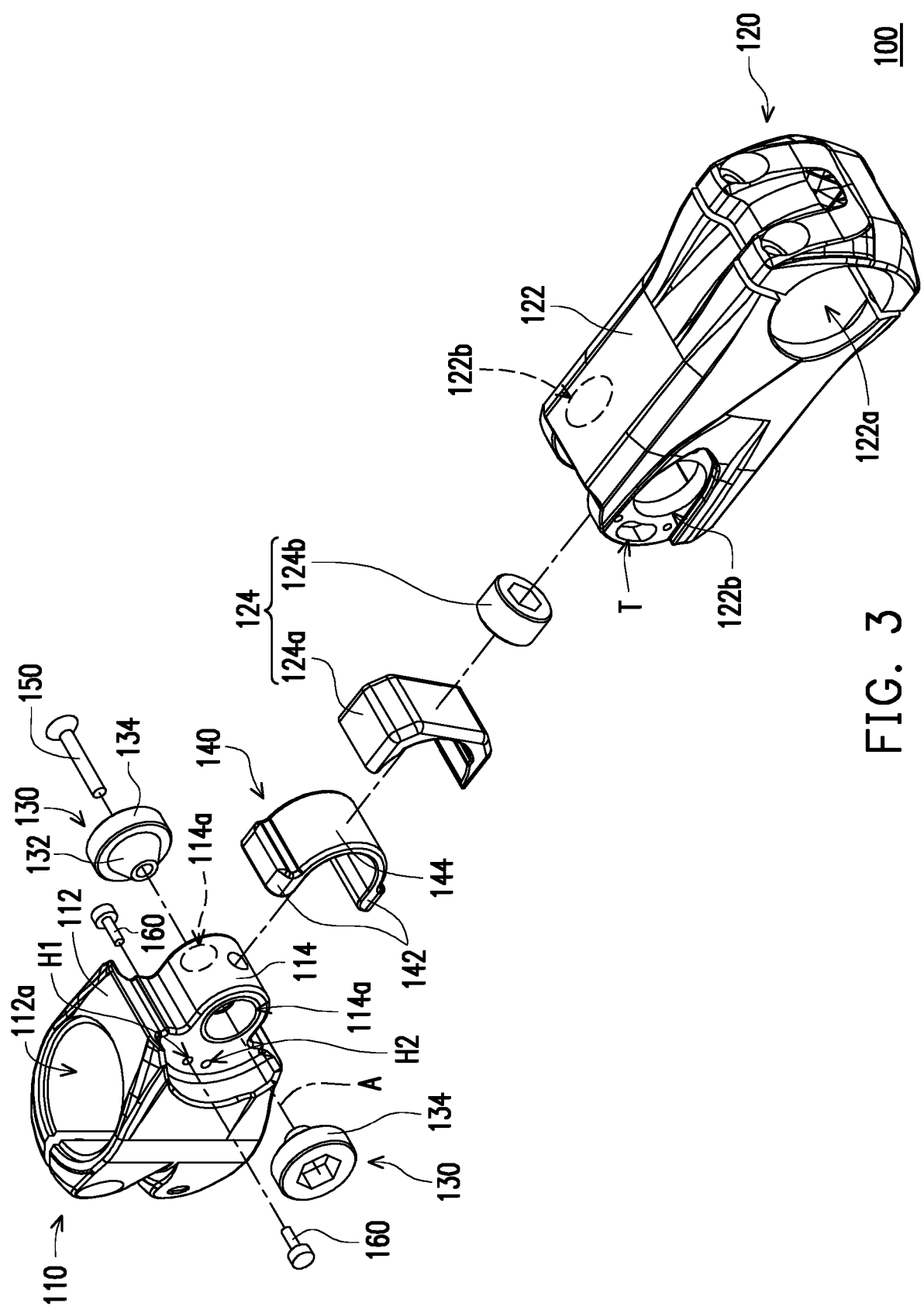
FIG. 3 is an exploded view of the shock absorption device of FIG. 1.
Figure 4:
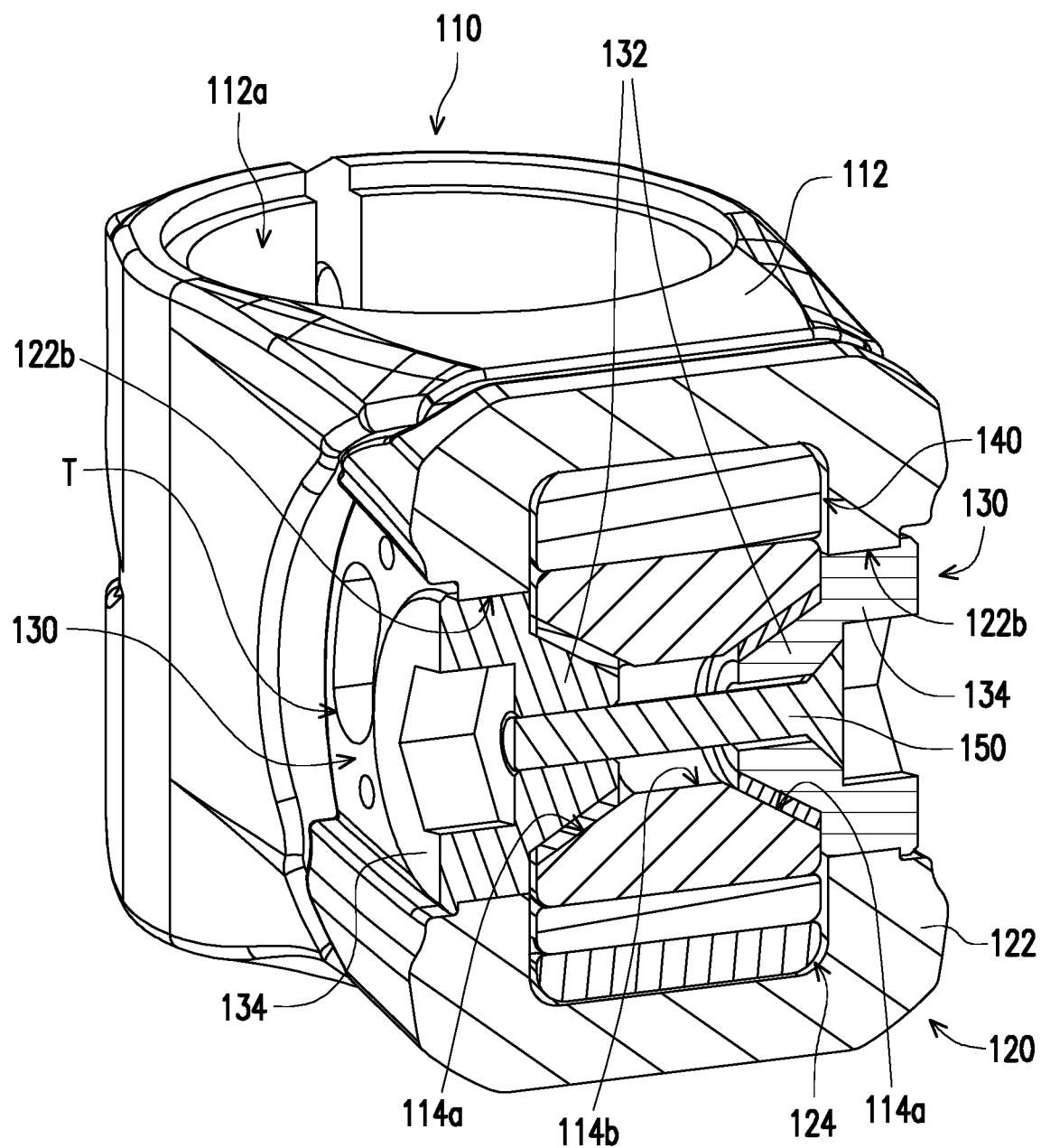
FIG. 4 illustrates a partial structure of the shock absorption device of FIG. 1.

FIG. 2 is a partial perspective view of the shock absorption device of FIG. 1. FIG. 3 is an exploded view of the shock absorption device of FIG. 1. FIG. 4 illustrates a partial structure of the shock absorption device of FIG. 1. Please refer to FIG. 2 to FIG. 4. The shock absorption device 100 of this embodiment further includes two pivot components 130 and a buffering component 140. The first assembly 110 has two conical holes 114a. The second assembly 120 has two fastening holes 122b. When the first assembly 110 and the second assembly 120 are connected to each other, each of the fastening holes 122b and each of the conical holes 114a have an equal center shaft A, and the two conical holes 114a are located between the two fastening holes 122b.

In detail, each of the pivot components 130 has a fastening portion 134. The fastening portion 134 is, for example, fastened the fastening hole 122b of the fastened second assembly 120 in a screw fastening manner. Each pf the pivot components 130 further has a conical portion 132. A taper of the conical portion 132 is equal to a taper of the conical hole 114a. The two conical portions 132 are respectively extended to the two conical holes 114a so that the first assembly 110 and the second assembly 120 are pivotally connected to each other, and that the first assembly 110 and the second assembly 120 are limited between the two pivot components 130. Each of the conical portions 132 is against the inner wall of the corresponding conical hole 114a. The conical portion 132 is leaned against the inner wall of the conical hole 114a by the fastening force between the pivot component 130 of the fastening portion 134 and the fastening hole 122b of the second assembly 120, so as to ensure no gap created between the conical portion and the conical hole through the cooperation between the conical portion 132 and conical hole 114a. As such, when the rider performs stand-up pedaling, a gap is not created between the first assembly 110 and the second assembly 120 owing to the movement of lifting the handles (e.g. stand-up pedaling), the rigidity of the shock absorption device 100 is thus maintained.

In this embodiment, the shock absorption device 100 further includes a fastening component 150. The first assembly 110 illustrated as FIG. 3 has a through hole 114b. The through hole 114b is connected between the two conical holes 114a. The fastening component 150 passes through the through hole 114b, and is fastened between two pivot components 130, so that the entire structure is more stable and less likely to be loosen.

A buffering component 140 of this embodiment is composed of, for example, an elastic material, and is disposed between the first assembly 110 and the second assembly 120. When the first assembly 110 and the second assembly 120 rotate relative to each other by using the center shaft A of the conical hole 122, the buffering component 140 buffers force, created by the first assembly 110 and the second assembly 120 interacting with each other. An effect of shock absorption is achieved.

In addition, the second assembly 120 of this embodiment includes a pre-pressing structure 124. The buffering component 140 is disposed between the main body 112 of the first assembly 110 and the pre-pressing structure 124. The pre-pressing structure 124 applies the pre-pressing force on the buffering component 140. As mentioned above, by using the pre-pressing structure 124 to pre-press on the buffering component 140, the user can adjust the shock absorption strength of the buffering component 140 merely through adjusting the pre-pressing force applied to the buffering component 140 by the pre-pressing structure 124. There is no need to change the buffering component 140. Therefore, the convenience in use of the shock absorption device 100 is improved.

The configuration of the buffering component 140 and the first assembly 110 of the embodiment is described in detail below. Please refer to FIG. 2. The first assembly 110 of the embodiment includes a protruding portion 114. The protruding portion 114 protrudes from the main body 112 of the first assembly 110 into the main body 122 of the second assembly 120. The conical hole 114a and the through hole 114b of the first assembly 110 are formed in the protruding portion 114. The buffering component 140 includes two buffering portions 142 and the connecting portion 144. The two buffering portions 142 are respectively located on the opposite sides of the protruding portion 114 and are against the main body 112 of the first assembly 110. The connecting portion 144 is connected between the two buffering portions and is extended along the exterior of the protruding portion. In the embodiment, the thickness of each of the buffering portions 142 is greater than the thickness of the connecting portion 144, so that apart from reducing weight, the movement of each of the buffering portions 142 becomes more swiftly.

The configuration of the pre-pressing structure 124 of the embodiment is described in detail below. Please refer to FIG. 2 and FIG. 3. In this embodiment, the pre-pressing structure 124 includes a pre-pressing component 124a and a screw component 124b. The buffering component 140 is disposed between the first assembly 110 and the pre-pressing component 124a. The screw component 124b is screwed on the main body 122 of the second assembly 120 and pushes the pre-pressing component 124a toward the buffering component 140. The user may rotate the screw component 124b to change the pre-pressing force of the pre-pressing component 124a applied on the buffering component 140. Specifically, the screw component 124b, for example, has an external screw pattern, whereas the main body 122 of the second assembly 120, for example, has a corresponding internal screw pattern for the screw component 124b to screw.

Figure 5A:
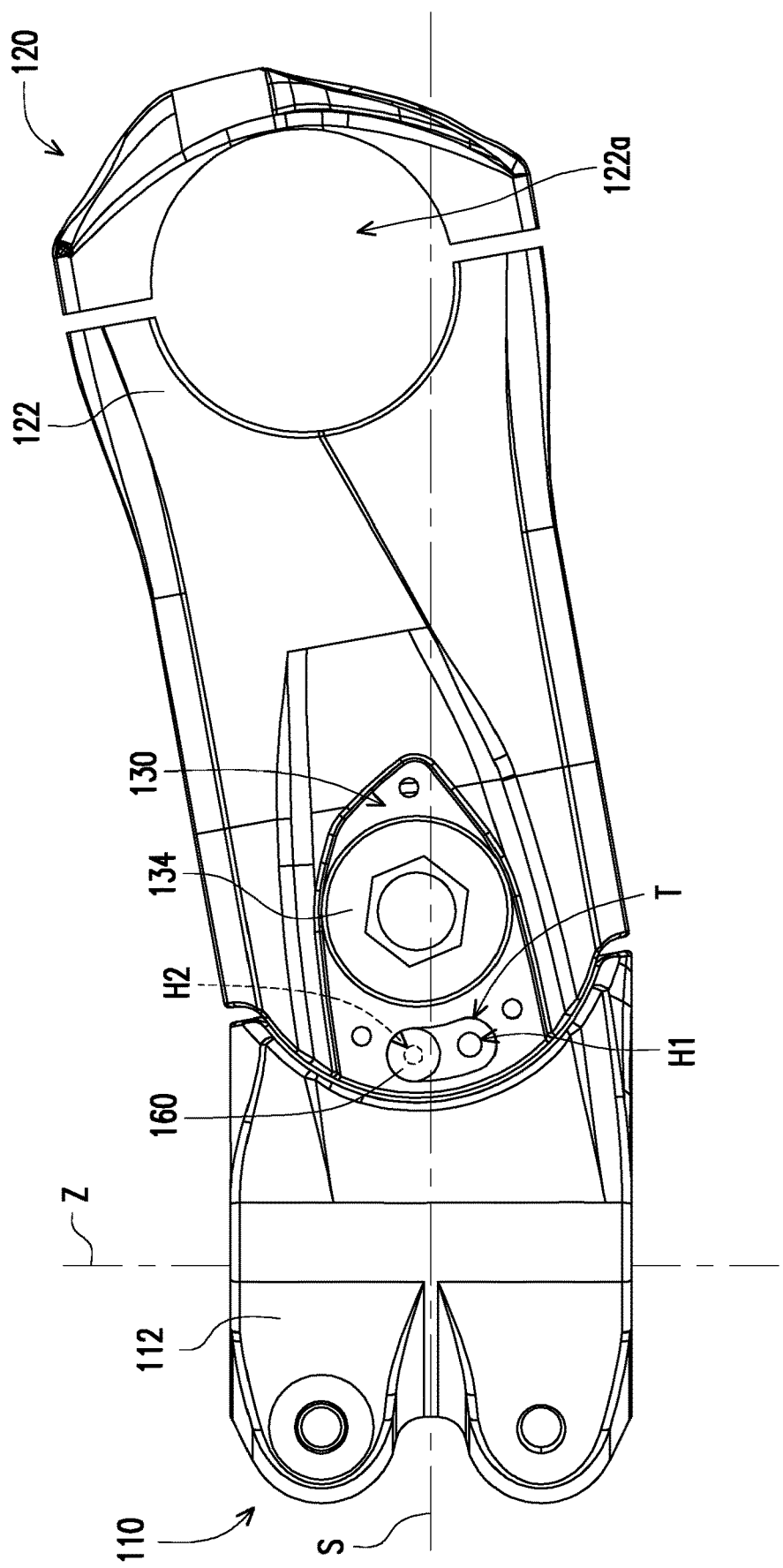
FIG. 5A illustrates a second assembly of FIG. 1 tilted upward.
Figure 5B:
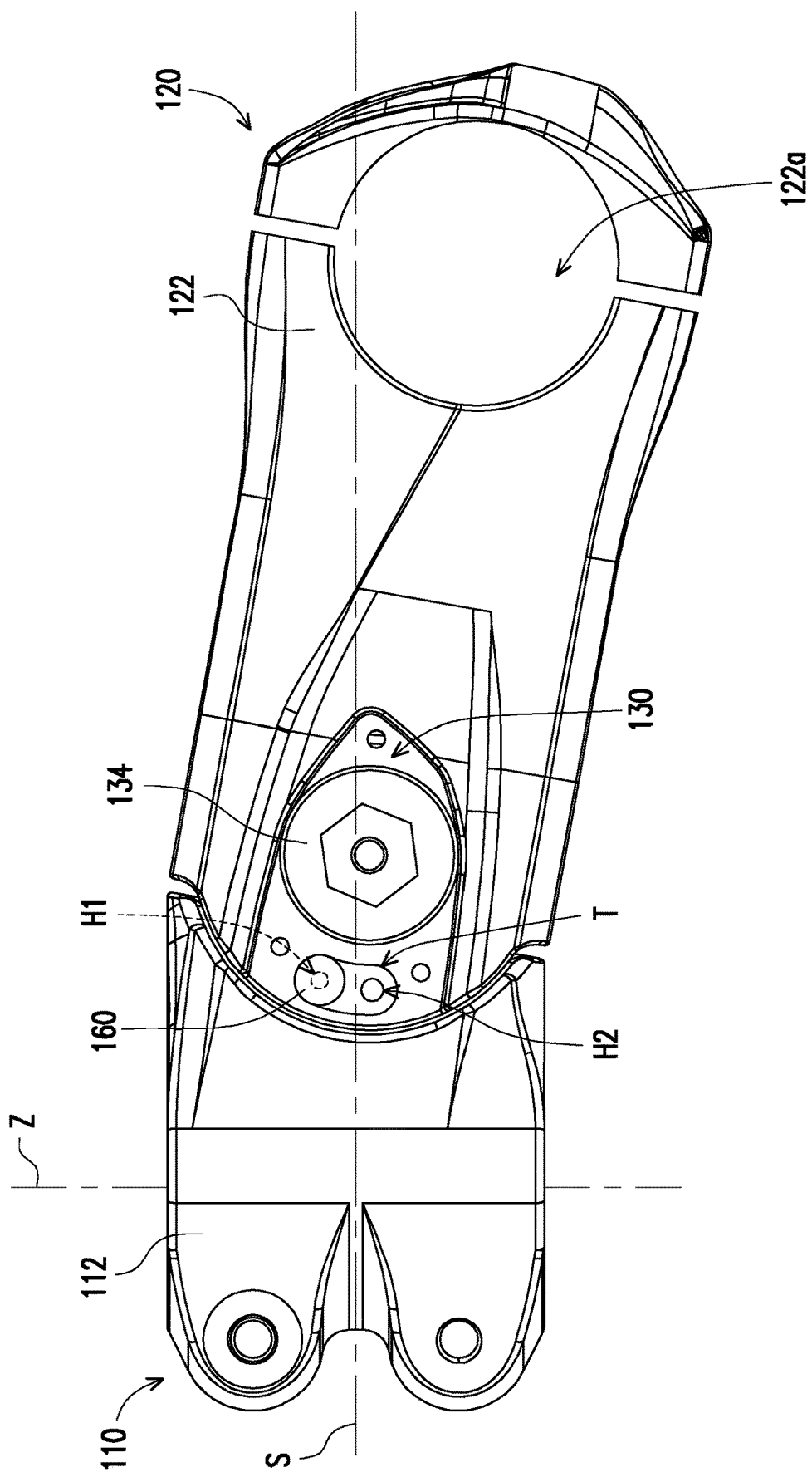
FIG. 5B illustrates a second assembly of FIG. 1 tilted downward.

FIG. 5A illustrates a second assembly of FIG. 1 tilted upward. FIG. 5B illustrates a second assembly of FIG. 1 tilted downward. The first assembly 110 of the embodiment is adapted to be assembled on the frame of the bicycle along an assembly axis Z vertical to a reference plane S (e.g. a horizontal plane), and the second assembly is tilted to the reference plane. The assembly axis Z is, for example, horizontal to a direction of gravity. Furthermore, the user may assemble the shock absorption device 100 in a manner that the second assembly 120 is tilted upward to the reference plane S as illustrated in FIG. 5A. The user may also reverse the shock absorption device 100 and assemble the shock absorption device 100 in a manner that the second assembly 120 is tilted downward to the reference plane S as illustrated in FIG. 5B.

Moreover, the shock absorption device 100 of the embodiment includes at least one positioning column 160 (two positioning columns are illustrated in FIG. 3). The first assembly 110 has two positioning holes H1 and H2 corresponding to each of the positioning columns 160. The second assembly 120 has a positioning slot T corresponding to each of the positioning columns 160. When the user assembles the shock absorption device 100 in a manner that the second assembly 120 is tilted upward to the reference plane S as illustrated in FIG. 5A, the positioning column 160 is adapted to pass through the positioning slot T to be fixed onto the positioning hole H2 and to be against an end of the positioning slot T, so that when the rider lifts the handles (e.g. stand-up pedaling), the second assembly 120 rotating upward relative to the first assembly 110 is avoided. In contrast, when the user assembles the shock absorption device 100 in a manner that the second assembly 120 is tilted downward to the reference plane S as illustrated in FIG. 5B, the positioning column 160 is adapted to pass through the positioning slot T to be fixed onto the other positioning hole H1 and to be against the other end of the positioning slot T, so that when the rider lifts the handles (e.g. stand-up pedaling), the second assembly 120 rotating upward relative to the first assembly 110 is avoided. In other words, through the cooperation of the positioning column 160 and the positioning holes H1 and H2, the second assembly 120 rotating upward relative to the first assembly 110 is avoided. A rigidity option is provided to the rider.

Furthermore, the buffering component 140 of the embodiment illustrated as FIG. 2 and FIG. 3 has two buffering portions 142 opposite to each other, an effect of shock absorption in dual direction while the first assembly 110 and the second assembly 120 rotate relative to each other is achieved. Therefore, whether the user assembles the shock absorption device 100 in the manner illustrated in FIG. 5A or FIG. 5B, good shock absorption ability is exhibited.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A shock absorption device adapted to a bicycle, the bicycle comprising a first component and a second component, the shock absorption device comprising:
   a first assembly, adapted to be connected to the first component, wherein the first assembly has at least one conical hole;
   a second assembly, adapted to be connected to the second component;
   at least one pivot component, fastened on the second assembly and having a conical portion, wherein the conical portion is inserted into the at least one conical hole such that the first assembly and the second assembly are pivoted to each other, and the conical portion is leaned against and fitted on an inner wall of the at least one conical hole; and
   a buffering component, disposed between the first assembly and the second assembly, wherein when the first assembly and the second assembly rotate relatively to each other by taking a central axis of the at least one conical hole as a rotation axis, force between the first assembly and the second assembly is buffered by the buffering component,
   wherein the first assembly comprises a main body and a protruding portion, the protruding portion protrudes from the main body of the first assembly into the second assembly, and the at least one conical hole is formed in the protruding portion.

2. The shock absorption device according to claim 1, wherein the conical portion is leaned against the inner wall of the at least one conical hole through fastening force between the at least one pivot component and the second assembly.

3. The shock absorption device according to claim 1, wherein a taper of the conical portion is equal to a taper of the at least one conical hole.

4. The shock absorption device according to claim 1, comprising a fastening component, wherein the second assembly has at least one fastening hole, the at least one fastening hole and the at least one conical hole have the same central axis, the fastening component has a fastening portion, and the fastening portion is fastened to the at least one fastening hole.

5. The shock absorption device according to claim 4, wherein the number of the at least one conical hole is two, the number of the at least one fastening hole is two, the number of the at least one pivot component is two, the two conical holes are located between the two fastening holes, and the first assembly and the second assembly are limited between the two pivot components.

6. The shock absorption device according to claim 5, wherein the first assembly has a through hole, the through hole is connected between the two conical holes, and the fastening component passes through the through hole and is fastened between the two pivot components.

7. The shock absorption device according to claim 1, wherein the buffering component comprises two buffering portions and a connecting portion, the two buffering portions are respectively located on the opposite sides of the protruding portion and are against the main body of the first assembly, and the connecting portion is connected between the two buffering portions and is extended along the exterior of the protruding portion.

8. The shock absorption device according to claim 7, wherein the thickness of each of the buffering portions are greater than the thickness of the connecting portion.

9. The shock absorption device according to claim 1, wherein the first assembly is adapted to be assembled on the first component of the bicycle along an assembly axis vertical to a reference plane, and when the second assembly is connected to the first assembly in a first state, the second assembly offsets upward away from the reference plane, and when the second assembly is connected to the first assembly in a second state, the second assembly offsets downward away from the reference plane.

10. The shock absorption device according to claim 9, comprising at least one positioning column, wherein the first assembly has at least one positioning hole, the second assembly has at least one positioning slot, and when the second assembly is in the first state or in the second state, the at least one positioning column is adapted to pass through the at least one positioning slot to be fixed onto the at least one positioning hole and to be against an end of the at least one positioning slot.

11. A shock absorption device, adapted to a bicycle, the bicycle comprising a first component and a second component, the shock absorption device comprising:
    a first assembly, adapted to be connected to the first component, wherein the first assembly has at least one conical hole;
    a second assembly, adapted to be connected to the second component, wherein the first assembly and the second assembly are pivotally connected to each other, and the second assembly comprises a pre-pressing structure;
    at least one pivot component, fastened on the second assembly and having a conical portion, wherein the conical portion is inserted into the at least one conical hole, and the conical portion is leaned against and fitted on an inner wall of the at least one conical hole; and
    a buffering component, disposed between the first assembly and the pre-pressing structure, wherein the pre-pressing structure applies pre-pressing force to the buffering component, and when the first assembly and the second assembly rotate relative to each other, the buffering component buffers the force that the first assembly and the second assembly interact with each other,
    wherein the first assembly comprises a main body and a protruding portion, the protruding portion protrudes from the main body of the first assembly into the second assembly, the second assembly is pivoted on the first assembly by the protruding portion, and the at least one conical hole is formed in the protruding portion.

12. The shock absorption device according to claim 11, wherein the pre-pressing structure comprises a pre-pressing component and a screw component, the buffering component is disposed between the first assembly and the pre-pressing component, the screw component is screwed on the second assembly and pushes the pre-pressing component toward the buffering component, and the screw component is adapted to rotate to change the pre-pressing force applied to the buffering component by the pre-pressing component.

13. The shock absorption device according to claim 11, wherein the buffering component comprises two buffering portions and a connecting portion, the two buffering portions are respectively located on the opposite sides of the protruding portion and are against the main body of the first assembly, and the connecting portion is connected between the two buffering portions and is extended along the exterior of the protruding portion.

14. The shock absorption device according to claim 13, wherein the thickness of each of the buffering portions is greater than the thickness of the connecting portion.

15. The shock absorption device according to claim 11, wherein the first assembly is adapted to be assembled on the first component of the bicycle along an assembly axis vertical to a reference plane, and the second assembly is tilted to the reference plane.

16. The shock absorption device according to claim 11, comprising at least one positioning column, wherein the first assembly has at least two positioning holes, the second assembly has at least one positioning slot, the at least one positioning column is adapted to pass through the at least one positioning slot to be fixed onto a hole of the at least two positioning holes and to be against an end of the at least one positioning slot, and the at least one positioning column is adapted to pass through the at least one positioning slot to be fixed onto another hole of the at least two positioning holes and to be against another end of the at least positioning slot.

\* \* \* \* \*